(12) United States Patent
Salam et al.

(10) Patent No.: US 8,880,656 B2
(45) Date of Patent: Nov. 4, 2014

(54) CUSTOMER EDGE DEVICE AUTO-CONFIGURATION

(75) Inventors: Samer Salam, Vancouver (CA); Wojciech Dec, Amsterdam (NL); Dennis Clare, Pleasanton, CA (US); Richard Manfred Pruss, Queensland (AU); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 12/464,688

(22) Filed: May 12, 2009

(65) Prior Publication Data
US 2010/0293233 A1    Nov. 18, 2010

(51) Int. Cl.
*G06F 15/177* (2006.01)
*H04L 12/46* (2006.01)

(52) U.S. Cl.
CPC ............................ *H04L 12/4641* (2013.01)
USPC ............................ 709/220; 709/206; 709/230

(58) Field of Classification Search
USPC ........................................ 709/206, 220, 230
See application file for complete search history.

(56) References Cited

U.S. PATENT DOCUMENTS

| | | | | |
|---|---|---|---|---|
| 7,043,541 | B1 * | 5/2006 | Bechtolsheim et al. | 709/223 |
| 7,136,374 | B1 * | 11/2006 | Kompella | 370/352 |
| 7,821,949 | B2 * | 10/2010 | Mohan et al. | 370/241.1 |
| 2004/0165595 | A1 * | 8/2004 | Holmgren et al. | 370/395.3 |
| 2005/0099949 | A1 * | 5/2005 | Mohan et al. | 370/236.2 |
| 2005/0249124 | A1 * | 11/2005 | Elie-Dit-Cosaque et al. | 370/242 |
| 2006/0159008 | A1 * | 7/2006 | Sridhar et al. | 370/216 |
| 2007/0201508 | A1 * | 8/2007 | Blackford et al. | 370/466 |
| 2007/0204330 | A1 * | 8/2007 | Townsley et al. | 726/4 |
| 2007/0214270 | A1 * | 9/2007 | Absillis | 709/227 |
| 2008/0002678 | A1 * | 1/2008 | Klessig et al. | 370/389 |
| 2008/0117902 | A1 * | 5/2008 | Vinneras | 370/389 |
| 2008/0133752 | A1 * | 6/2008 | Liekens et al. | 709/225 |
| 2008/0212495 | A1 * | 9/2008 | Stirbu | 370/254 |
| 2008/0215668 | A1 * | 9/2008 | Hu | 709/202 |
| 2008/0219172 | A1 * | 9/2008 | Mohan et al. | 370/241.1 |
| 2008/0298259 | A1 * | 12/2008 | Susilo | 370/248 |
| 2009/0019104 | A1 * | 1/2009 | Justen et al. | 709/202 |
| 2009/0086688 | A1 * | 4/2009 | Kvache et al. | 370/338 |
| 2009/0129291 | A1 * | 5/2009 | Gupta et al. | 370/254 |
| 2009/0132682 | A1 * | 5/2009 | Counterman | 709/220 |
| 2009/0219820 | A1 * | 9/2009 | Acke et al. | 370/241 |

OTHER PUBLICATIONS

Cisco ME 3400 Ethernet Access Switch Software Configuration Guide, Nov. 2005, Chapter 34, 16 pgs.
Metro Ethernet Forum Technical Specification MEF 16, Ethernet Local Management Interface (E-LMI), Jan. 2006, 41 pgs.
C. de Laat et al., Generic AAA Architecture, Aug. 2000, 25 pgs. available on May 12, 2009 at http://www.ietf.org/rfc/rfc2903.txt.

* cited by examiner

*Primary Examiner* — Thomas Dailey
(74) *Attorney, Agent, or Firm* — Brinks Gilson & Lione

(57) ABSTRACT

A customer edge device is automatically configured. A request for customer edge device configuration data may be transmitted to a provider edge device via an Ethernet-layer operations, administration, maintenance, and provisioning (OAM&P) protocol. The request for configuration data may be relayed from the Ethernet-layer OAM&P protocol to a configuration protocol. The request for configuration data may be transmitted from the provider edge device to a configuration repository server via the configuration protocol. The configuration repository server may transmit the requested configuration data to the provider edge device via the configuration protocol. The provider edge device may relay the configuration data from the configuration protocol to the Ethernet-layer OAM&P protocol and transmit the configuration data to a customer edge device via the Ethernet-layer OAM&P protocol. The customer edge device may automatically configure itself using the configuration data.

25 Claims, 4 Drawing Sheets

CUSTOMER EDGE DEVICE AUTO-CONFIGURATION

BACKGROUND

The present disclosure generally relates to configuring customer edge devices in a network.

Customer edge devices, such as bridges, may be used in a network for transferring network traffic between a customer site and a service provider. The customer edge device may be connected to a provider edge device, such as a bridge. Typically, a customer edge device is configured when connected to a network. During configuration, a customer edge device may use data provided through the network. A customer edge device may request configuration, resulting in receipt of configuration data.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
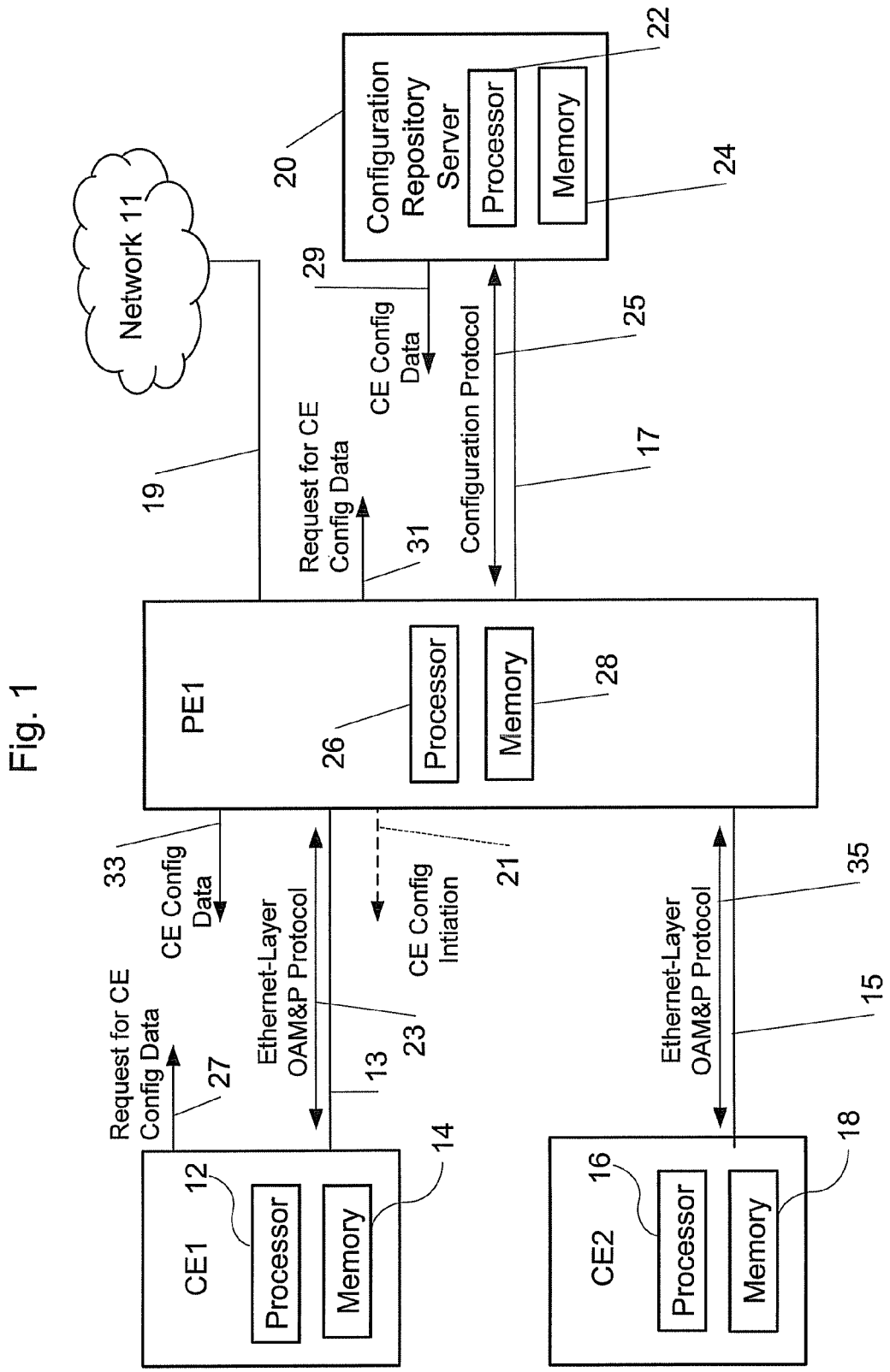
FIG. 1 illustrates one example of a system for configuring a customer edge device.

By way of introduction, the example embodiments described below include a system, computer readable media, and a method for automatic configuration of a customer edge device through interaction of an Ethernet-layer operations, administration, maintenance, and provisioning (OAM&P) protocol and a configuration protocol.

According to a first aspect, a system is provided. The system may include a customer edge device, a server, and a provider edge device. The server may be configured to store configuration data for the customer edge device. The provider edge device may be a configured to receive a request for the configuration data transmitted from the customer edge device via an Ethernet-layer operations, administration, maintenance, and provisioning (OAM&P) protocol. The provider edge device may be further configured to retrieve the configuration data from the server via a configuration protocol based on the request for configuration data. The provider edge device may be further configured to transmit the configuration data to the customer edge device via the Ethernet-layer OAM&P protocol.

According to a second aspect, a method is provided. The method may include transmitting a customer edge device configuration data request via an Ethernet-layer OAM&P protocol. The method may further include relaying the customer edge device configuration data request from an Ethernet-layer OAM&P protocol to a configuration protocol. The method may further include transmitting customer edge device configuration data via the configuration protocol. The method may further include relaying the customer edge device configuration data from the configuration protocol to the Ethernet-layer protocol. The method may further include transmitting the customer edge device configuration data via the Ethernet-layer OAM&P protocol. The method may further include performing a customer edge device configuration with the customer edge device configuration data.

According to a third aspect, logic encoded in one or more tangible media for execution is included. The logic, when executed, may be operable to transmit a configuration data request for a customer edge device to a provider edge device via an Ethernet-layer OAM&P protocol to a provider edge device. The logic, when executed, may be further operable to transmit the configuration data request from the provider edge device to a server via a configuration protocol. The logic, when executed, may be further operable to transmit configuration data for the customer edge device to a provider edge device from the server via the configuration protocol. The logic, when executed, may be further operable to transmit the configuration data from the provider edge device to the customer edge device via the Ethernet-layer OAM&P protocol. The logic, when executed, may be further operable to configure the customer edge device with the configuration data.

The present invention is defined by the following claims, and nothing in this section should be taken as a limitation on those claims. Further aspects and advantages of the invention are discussed below in conjunction with the example embodiments.

Example Embodiments

A customer edge device may be automatically configured via an Ethernet-layer operations, administration, maintenance, and provisioning (OAM&P) protocol and a configuration protocol. The customer edge device may request configuration data via an Ethernet-layer OAM&P protocol. In one example, the Ethernet-layer OAM&P protocol may be an extension of IEEE standard 802.3ah link operations, administration, and maintenance (OAM). A provider edge device may transmit the request to a server via the configuration protocol. The server may transmit customer edge device configuration data via the configuration protocol based on the request. The provider edge device may transmit the configuration data to the customer edge device via the Ethernet-layer OAM&P protocol. The customer edge device may automatically configure itself using the configuration data.

FIG. 1 illustrates one example embodiment of a system 10 included in a network 11. In one example, the system 10 is configured to allow auto-configuration of customer edge (CE) devices CE1, CE2. In one example, a CE device may be a bridge, which may also include a host computing device or devices. In other examples, a CE device may be a single or various devices suitable for directing network traffic. For automatic configuration, or auto-configuration, a CE device configures itself once the appropriate configuration data is received by the CE device.

In one example, the CE devices CE1, CE2 may be used in a Carrier Ethernet-based network, such as a Metro Ethernet Network (MEN). In an example MEN, a service provider may provide various network services to a number of customers. Such services may be intranet, extranet, virtual private network (VPNs), and virtual local area network (VLAN) services. Each customer may use at least one CE device for transferring network traffic between the customer site and the network.

The CE devices CE1, CE2 shown in system 10 of FIG. 1 may be used in an Ethernet layer 2 (L2) VPN, or other L2-based network configuration, and thus, a CE device may be configured in order to coordinate Ethernet L2 service characteristics. "Layer 2" refers to layer 2 of the Open Systems Interconnection Basic Reference Model. L2, also known as the "Data Link Layer" to those of skill in the art, may respond to service requests from the "network layer," or "layer 3," and issues service requests to the "physical layer," or "layer 1." The CE devices CE1, CE2 may be used in other layers.

L2 may be used to transfer data between adjacent network nodes in a wide area network or between nodes on the same local area network segment. L2 may provide the functional and procedural manners to transfer data between network entities and may provide detection and correction of errors that may occur in layer 1. Examples of L2 protocols are Ethernet, point-to-point protocol (PPP), high-level data link control (HDLC), and advanced data communication control procedures (ADCCP) for point-to-point connections. Other standards or non-standard data transfer protocols may be used.

In example embodiments, the CE devices CE1, CE2 may be implemented as bridges (e.g., switches) or on-site customer devices. A CE device is configured in order to operate properly on a network. In example embodiments, CE device configuration may include each CE device receiving configuration data informing each CE device of the Ethernet L2 services to be enforced or optimized. For example, committed information rates per virtual circuit may be communicated to a CE device, and set during configuration. Various other service-based parameters may be set during CE device configuration, such as customer edge VLANs, Ethernet virtual connection (EVC) names, and committed burst size.

The CE devices CE1, CE2 may be bridges including servers, processors, computers, cards, or other now known or later developed computer network device. In the example shown in FIG. 1, the CE device CE1 includes a processor 12 and a memory 14. Similarly, in one example, the CE device CE2 may include a processor 16 and a memory 18. The CE devices CE1, CE2 are shown as being connected to a PE device PE1 through connections 13, 15, respectively. In one example, the PE device PE1 may be a bridge, or other suitable device or devices configured to manipulate the flow of network traffic over Ethernet L2 services. The PE device PE1 is shown as being connected to a server 20 through connection 17 and to the network 11 through connection 19. Each of the connections 13, 15, 17, 19 may be a single or series of network connections linking the devices to one another, such as in the manner described. Any computer network link or communications path may be used, such as direct or indirect linking.

In one example, the server 20 may be a configuration repository server. The configuration repository server 20 may include a processor 22 and a memory 24. The memory 24 of the configuration repository server 20 may store various CE device configurations, which may be used by a particular CE device for auto-configuration.

CE devices may be configured after connection to a network, such as after a CE device has been connected to and authorized by a PE device that is part of a network. In FIG. 1, the CE device CE1 may be initially connected to the PE device PE1 through the connection 13 of the system 10. The system 10 may be part of a portion of an Ethernet-layer network, which in one example may be the network 11. The CE device CE1 and the PE device PE1 may communicate with one another through an Ethernet-layer OAM&P protocol during configuration of the CE device CE1 as indicated by an arrow 23. For example, the CE device CE1 may request configuration data from the PE device PE1 through an Ethernet-layer OAM&P protocol.

In one example, the Ethernet-layer OAM&P protocol may be an Ethernet local management interface (E-LMI) protocol, which is a protocol used to enable a CE device to request and receive status and service attributes information so that it may configure itself to access Ethernet services, such as Metro Ethernet services. For example, the E-LMI protocol may be that as defined by the Metro Ethernet Forum Technical Specification MEF 16 ("MEF 16 Specification").

The PE device PE1 device and configuration repository server 20 may communicate with one another through the connection 17 according to a configuration protocol, as indicated by an arrow 25. In one example, the configuration protocol may be an authentication, authorization, and accounting (AAA) protocol. In another example, the configuration protocol may be the customer premise equipment (CPE) wide area network (WAN) management protocol (CWMP) or other suitable protocol. Other protocols may be used as either the CWMP or the AAA protocol, such as remote authentication dial in user service (RADIUS), Diameter, service gateway interface (SGI), terminal access controller access-control system (TACACS), TACACS+, etc.

In one example, the CE device CE1 may be initially connected to the system 10 and request configuration via an Ethernet-based OAM&P protocol, as indicated by an arrow 27 through the connection 13. For example, this CE device CE1 may transmit a request for configuration data according to the E-LMI protocol through a "status enquiry" message as defined by the MEF 16 Specification. The status enquiry message may request a "full status" report, which provides the CE device CE1 information allowing the CE device CE1 to be auto-configured. In an alternative example, the PE device PE1 may trigger the CE device CE1 to request configuration data as indicated by an arrow 21. In one example, the PE device may transmit an asynchronous status message to the CE device CE1, which may cause the CE device to transmit a configuration request, such as a status enquiry message.

Upon receiving the E-LMI protocol status enquiry, the PE device PE1 may execute a CE-identification scheme, which may be stored in a memory 28 of PE device PE1 and executed on a processor 26 of the PE device PE1. This allows identification of a particular CE device requesting configuration data to ensure the CE device is authorized to be part of the network. The PE device may also execute an authentication/authorization application to authenticate and authorize the presence of a CE device on the network 11. In one example, the PE device may authenticate and authorize a CE device based on an identification of the CE device, such as a media access control (MAC) address, previously stored by the PE device upon initial connection of the CE device. The authentication/authorization application may be implemented through various suitable manners, such as port-based, IEEE 802.1-based, Dynamic Host Configuration Protocol (DHCP), Point-to-Point Protocol over Ethernet (PPPoE), and E-LMI with extensions, for example.

Once the status enquiry is received by the PE device PE1, the PE device PE1 relays the information received via the E-LMI protocol from the CE device CE1, such as the status enquiry, to the configuration protocol. This protocol relay allows the proper conversion of data encoding, and thus allows the PE device PE1 to properly communicate with the configuration repository server 20. In one example, the protocol transfer may be performed through use of a processor 26 and a memory 28 of the PE device PE1. In one example, the PE device PE1 may rely on both data received via the E-LMI protocol and the authentication/authorization application to fully identify the CE device CE1.

The PE device PE1 may transmit the request for configuration data to the configuration repository server 20 via the configuration protocol through the connection 17, as indicated by an arrow 31. This request may include identification of the CE device CE1 to the configuration server 20. The processor 22 of the configuration repository server 20 may process the request received from the PE device PE1. The configuration repository server 20 may also store various CE device configurations in the memory 24. Upon receipt of request for configuration data, the configuration repository server 20 may determine the identity of the CE device CE1. Alternatively, the PE device PE1 indicates the identity. The configuration repository server 20 may then determine the appropriate configuration data stored in the memory 24 of the configuration repository server to transmit for receipt by the CE device CE1 for auto-configuration.

Once the appropriate CE configuration data is determined, the configuration repository server 20 may transmit the CE configuration data through the connection 17, such as the information related to a full status report. This information is transmitted to the PE device PE1 via the configuration protocol as indicated by an arrow 29. Upon receipt of the of CE configuration data, the PE device PE1 may transfer the data received according to configuration protocol to the E-LMI protocol. The PE device PE1 may then transmit the configuration data, as indicated by an arrow 33, through the connection 13, such as the full status report to the CE Device CE1, allowing auto-configuration of the CE device CE1.

In one example, the PE device may receive the CE configuration data via the configuration protocol in the form of a configuration protocol message and validate the configuration protocol message. The PE device may parse and extract the configuration data contained in the configuration protocol message. The PE device may interpret and translate the configuration information into a format that may be implemented by the OAM&P Ethernet protocol. The PE device may also populate the translated configuration information into the appropriate OAM&P Ethernet protocol message or messages and transmit those to the CE.

In one example, the CE device CE2 may be configured in a manner similar to CE device CE1. The CE device CE2 may transmit a request for CE configuration data from the PE device PE1 via an Ethernet-layer OAM&P protocol, as indicated by an arrow 35, such as E-LMI protocol, for example. The PE device PE1 may relay the request from the Ethernet-layer protocol to the configuration protocol. The request may then be transmitted to the configuration repository server 20, which may, in response, transmit the requested CE configuration data to the PE device PE1 via the configuration protocol. The PE device PE1 may then transfer the CE configuration data from the configuration protocol to the Ethernet-layer OAM&P protocol and transmit the CE configuration data to the CE device CE2 for auto-configuration.

In one example, the system 10 may include a plurality of PE devices with each PE device connected to a plurality of CE devices according to a particular network configuration. The plurality of PE devices may share a commonly-connected server or be independently connected to a number of servers, such as the configuration repository server 20, configured to store data for various CE configurations.

In one example, the interaction of the CE devices CE1, CE2, PE device PE1, and configuration repository server 20 described and shown in FIG. 1 allows various options that are unavailable when a PE device is responsible for storing configuration data for CE devices. For example, through storage of CE device configuration data in the configuration repository server 20, a management channel may be extended to a CE device without a layer 3 topology overlaid for the purpose of accessing the CE device configuration. Furthermore, the configuration of the system 10 described in regard to FIG. 1 also allows a CE device to be re-configured depending on the service attributes, thus allowing a CE device to be re-used without being replaced by a CE device having a different configuration. In another example, the configuration of system 10 described above may allow memory on the PE device to be used for purposes other than storing CE device configuration data. In alternative embodiments, the PE device may store at least a portion of the CE configuration data.

Figure 2:
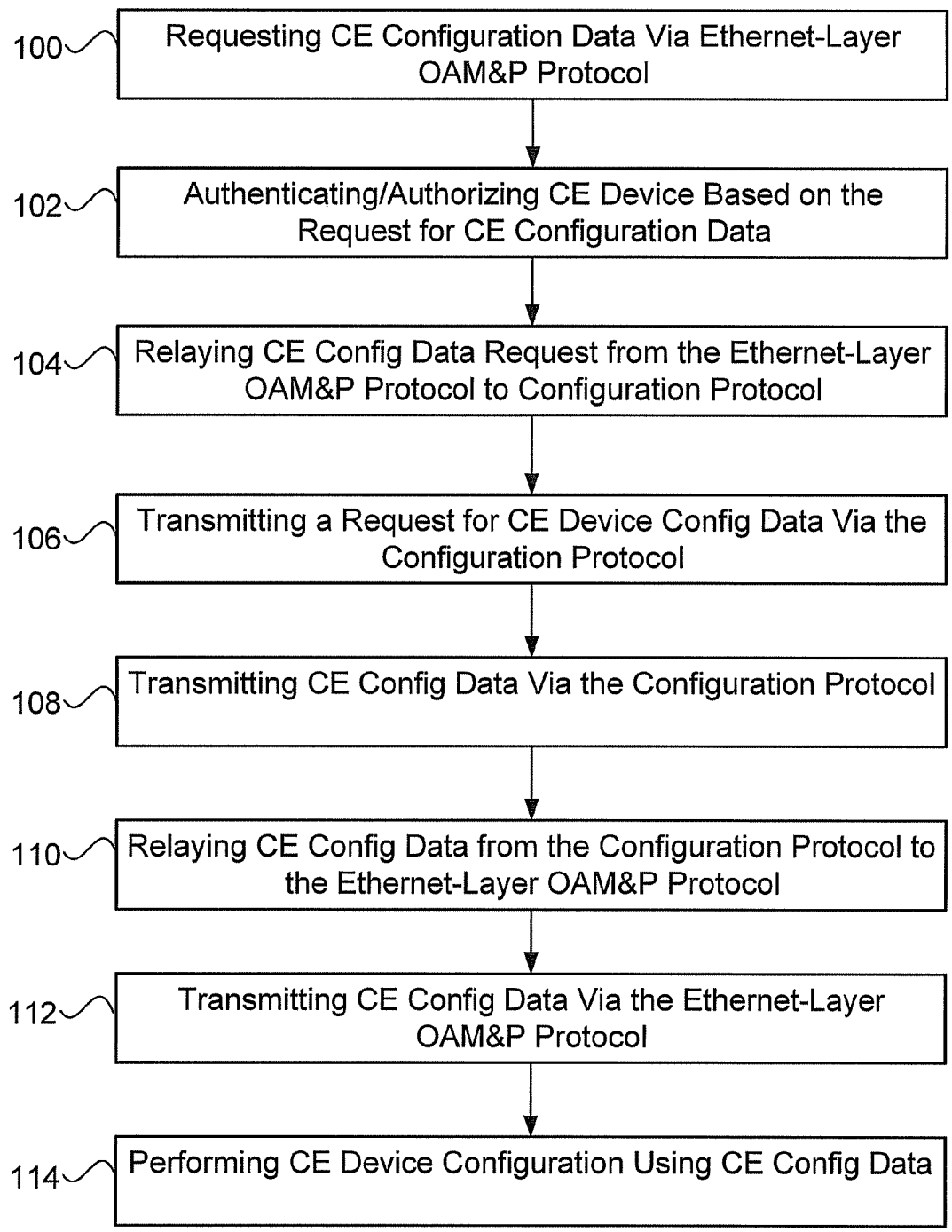
FIG. 2 illustrates one example of a method for configuring a customer edge device.

FIG. 2 shows an example method for configuring a CE device in a network, such as the network 11 configured as a MEN or a different network. The method may include an act 100 of requesting CE configuration data via an Ethernet-layer OAM&P protocol. In one example, the act 100 may be performed by a CE device, such as the CE device CE1 transmitting a configuration data request to the PE device PE1 through an E-LMI protocol. The method may also include an act 102 of authenticating and authorizing a presence of a CE device on a network based on the request for configuration data. In one example, the act 102 may be performed by a PE device, such as PE device PE1, authenticating and authorizing presence of the CE device CE1 on the network 11 based on the request for CE configuration data sent by the CE1 device in a manner similar to that described with regard to FIG. 1.

The method may also include an act 104 of relaying the request for CE configuration data from the Ethernet-layer OAM&P protocol to a configuration protocol such as the AAA protocol or CWMP. In one example, the act 104 may be performed by a PE device such as the PE device PE1 described with regard to FIG. 1. Alternatively, the PE device passes the request to another device or network node for transfer between protocols. The method may also include an act 106 of transmitting a request for CE device configuration data according to the configuration protocol. In one example, the act 106 may be performed with the PE device PE1 transmitting the request for CE configuration data to the repository configuration server 20.

The method may also include an act 108 of transmitting the requested CE device configuration data via the configuration protocol. In one example, the act 108 may be performed by the configuration repository server 20 transmitting the CE device configuration data to the PE device PE1 based on the CE configuration data request via the configuration protocol as discussed in regard to FIG. 1. The method may also include an act 110 of relaying the requested CE device configuration data from the configuration protocol to the Ethernet-layer OAM&P protocol. In one example, the act 110 may be performed by the PE device PE1 in a manner described according to FIG. 1 in which the PE device PE1 transfers the CE configuration data from the configuration protocol to the Ethernet-layer OAM&P protocol, such as the E-LMI protocol.

The method may also include an act 112 of transmitting the requested configuration data via an Ethernet-layer OAM&P protocol. In one example, the act 112 may be performed in the manner described according to FIG. 1, such as the PE device PE1 transmitting the CE configuration data to the CE device via the Ethernet-layer OAM&P protocol. The method may also include an act 114 of performing a CE device configuration using CE configuration data received. In one example, the act 114 may be performed by a CE device, such as the CE device CE1 described in regard to FIG. 1. The CE device CE1 may auto-configure itself using the requested CE device configuration data. One or more operation parameters may be set based on the configuration data.

Figure 3:
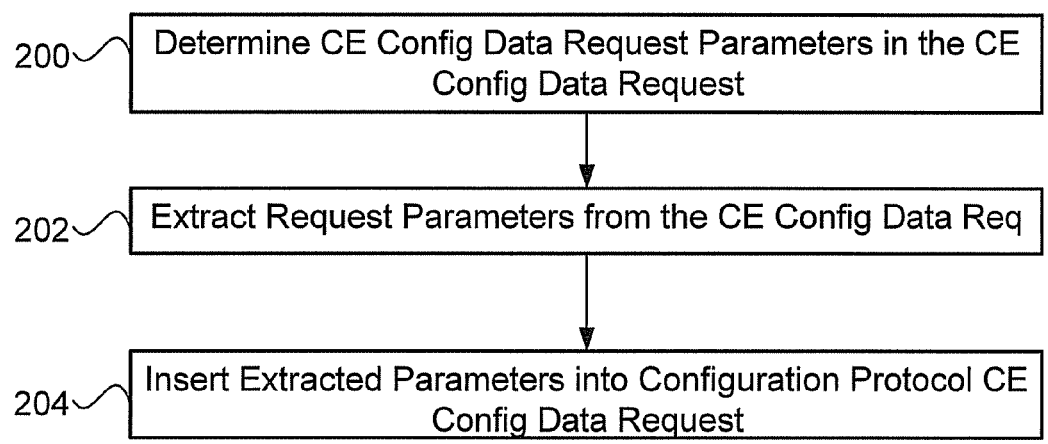
FIG. 3 illustrates one example of a method for relaying a customer edge configuration data request from a first protocol to a second protocol.

FIG. 3 shows an example method of relaying a CE configuration data request from an Ethernet-layer OAM&P protocol to a configuration protocol. In one example, the method of FIG. 3 may be performed by a PE device, such as the PE device PE1 of FIG. 1. The method may include an act 200 of determining CE configuration data request parameters in the CE configuration data request. The method may further include an act 202 of extracting the request parameters from the CE configuration data request. The method may further include an act 204 of inserting the extracted parameters into a CE configuration data request formatted according to the configuration protocol. In one example, the method of FIG. 3 may be used in the act 104 of the example method of FIG. 2.

Figure 4:
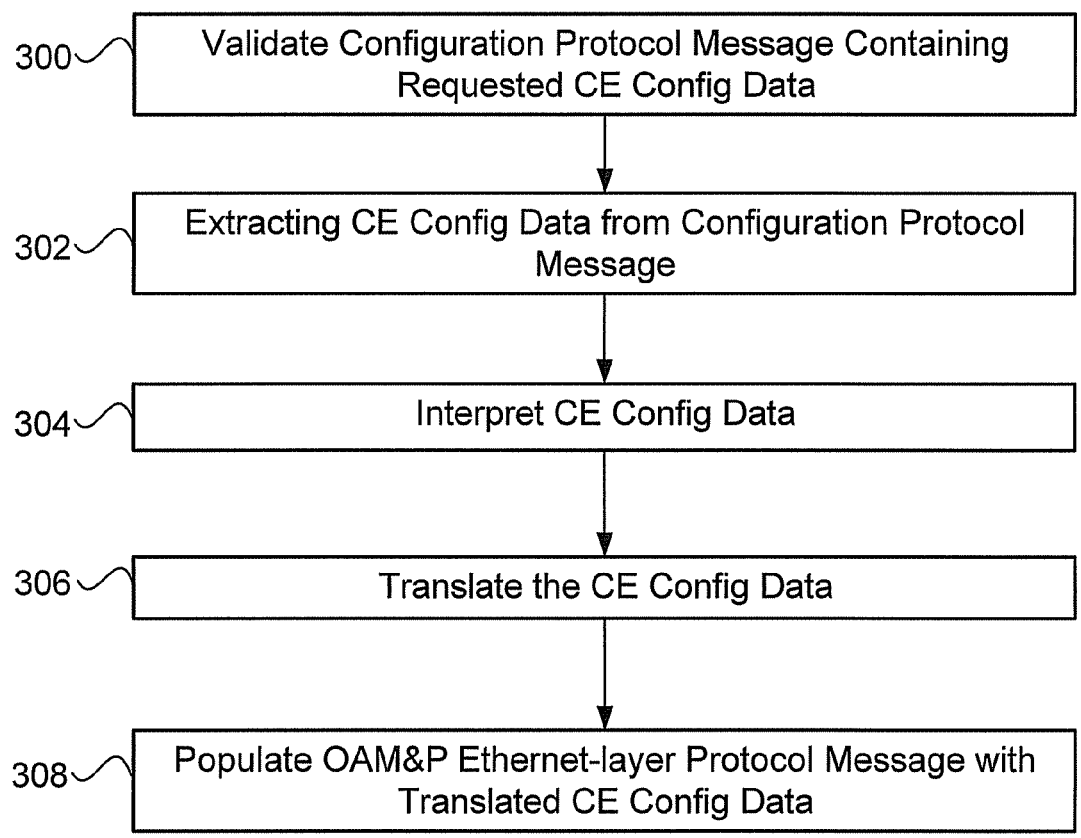
FIG. 4 illustrates one example of a method for relaying customer edge configuration data from the second protocol to the first protocol.

FIG. 4 shows an example method of relaying CE configuration data from a configuration protocol to an Ethernet-layer OAM&P protocol. The method of FIG. 4 may be performed by a PE device such as the PE device of FIG. 1. The method may include an act 300 of validating a configuration protocol message containing requested CE configuration data. The validation of the act 300 may also include parsing the CE configuration data contained in the configuration protocol message. The method may further include an act 302 of extracting the configuration data contained in the configuration protocol message. The method may further include an act 304 of interpreting the CE configuration data. The method may further include an act 306 of translating the CE configuration data into a format that may be implemented by an Ethernet-layer OAM&P protocol. The method may include an act 308 of populating the translated configuration information into the appropriate OAM&P Ethernet protocol message, which may be transmitted to the requesting CE device. In one example, the method of FIG. 4 may be implemented in the act 110 of the example method of FIG. 2.

The memory 14, 18, 24, 28 is additionally or alternatively a computer readable storage medium with processing instructions. Data representing instructions executable by the programmed processors 12, 16, 22, 26 is provided for auto-configuration of CE devices. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

In one example, the methods of FIGS. 2, 3, and 4 may be performed through logic encoded on at least one memory 14, 18, 24, 28 and executed on at least one of the associated processors 12, 16, 22, 26 described according to FIG. 1. In one example, configuration of the CE device may be performed according to the method of FIG. 2 through logic encoded on each memory 14, 18, 24, 28 and executed by the processors 12, 16, 22, 26. The logic in each memory is appropriate for the associate processor. The logic in the PE device is for receiving a request for configuration data, transferring between protocols, as in FIGS. 3 and 4, transmitting the request, receiving the response, transferring between protocols, and transmitting the transferred response. The logic in the CE device is for requesting configuration data, receiving a response, and automatically configuring based on the configuration data. The logic in the server is for receiving a request, looking up configuration data, and transmitting the configuration data. Logic encoded in one or more tangible media for execution is defined as the instructions that are executable by a programmed processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. An apparatus comprising:
a memory; and
a processor in communication with the memory, the processor configured to:
receive a customer edge device configuration data request for Layer 2 data link layer customer edge device configuration data from a customer edge device via an Ethernet-layer operations, administration, maintenance, and provisioning (OAM&P) protocol,
retrieve the Layer 2 data link layer customer edge device configuration data via a configuration protocol in response to the customer edge device configuration data request received via the Ethernet-layer OAM&P protocol; and
transmit the Layer 2 data link layer customer edge device configuration data to the customer edge device via the Ethernet-layer OAM&P protocol.

2. The apparatus of claim 1, wherein the customer edge device configuration data request is generated by the customer edge device; and
wherein the processor is further configured to authenticate and authorize presence of the customer edge device on a network based on the customer edge device configuration data request.

3. The apparatus of claim 1, wherein the configuration protocol is one of an authentication, authorization, and accounting (AAA) protocol and a customer premise equipment wide area network management protocol (CWMP).

4. The apparatus of claim 1, wherein the Ethernet-layer OAM&P protocol is Ethernet local management interface (E-LMI) protocol.

5. The apparatus of claim 1, wherein the processor is further configured to relay the customer edge device configuration data request from the Ethernet-layer OAM&P protocol to the configuration protocol.

6. The apparatus of claim 5, wherein the customer edge device configuration data request comprises a first customer edge device configuration data request, and wherein the processor is further configured to:

determine customer edge device parameters contained in the first customer edge device configuration data request;

extract the customer edge device parameters from the first customer edge device configuration data request; and insert the extracted customer edge device parameters into a second customer edge device configuration data request, the second customer edge device configuration data request being formatted according to the configuration protocol.

7. The apparatus of claim 1, wherein the processor is further configured to relay the Layer 2 data link layer customer edge device configuration data from the configuration protocol to the Ethernet-layer OAM&P protocol.

8. The apparatus of claim 7, wherein the processor is further configured to:

validate a message via the configuration protocol containing the Layer 2 data link layer customer edge device configuration data;

extract the Layer 2 data link layer customer edge device configuration data from the message;

interpret the Layer 2 data link layer customer edge device configuration data;

translate the Layer 2 data link layer customer edge device configuration data into an Ethernet-layer OAM&P protocol format; and populate an Ethernet-layer OAM&P protocol message with the translated Layer 2 data link layer customer edge device configuration data.

9. The apparatus of claim 1, wherein the processor is further configured to generate an Ethernet-layer OAM&P protocol message in order to trigger the customer edge device to generate the customer edge device configuration data request.

10. The apparatus of claim 1, wherein the Ethernet-layer OAM&P protocol is an extended version of IEEE standard 802.3ah.

11. A method comprising:

receiving a customer edge device configuration data request for Layer 2 data link layer customer edge device configuration data from a customer edge device via an Ethernet-layer OAM&P protocol;

relaying the customer edge device configuration data request from the Ethernet-layer OAM&P protocol to a configuration protocol;

transmitting the customer edge device configuration data request via the configuration protocol;

receiving the Layer 2 data link layer customer edge device configuration data via the configuration protocol in response to transmitting the customer edge device configuration data request via the configuration protocol;

relaying the Layer 2 data link layer customer edge device configuration data from the configuration protocol to the Ethernet-layer OAM&P protocol; and transmitting the Layer 2 data link layer customer edge device configuration data to the customer edge device via the Ethernet-layer OAM&P protocol.

12. The method of claim 11, further comprising performing a customer edge device configuration with the Layer 2 data link layer customer edge device configuration data.

13. The method of claim 11, wherein the customer edge device configuration data request comprises a first customer edge device configuration data request, and wherein relaying the customer edge device configuration data request from the Ethernet-layer OAM&P protocol to the configuration protocol comprises:

determining customer edge device parameters contained in the first customer edge device configuration data request;

extracting the customer edge device parameters from the first customer edge device configuration data request; and inserting the customer edge device extracted parameters into a second customer edge device configuration data request formatted according to the configuration protocol.

14. The method of claim 11, wherein relaying the Layer 2 data link layer customer edge device configuration data from the configuration protocol to the Ethernet-layer protocol comprises:

validating a message via the configuration protocol containing the Layer 2 data link layer customer edge device configuration data;

extracting the Layer 2 data link layer customer edge device configuration data from the message;

interpreting the Layer 2 data link layer customer edge device configuration data;

translating the Layer 2 data link layer customer edge device configuration data into an Ethernet-layer OAM&P protocol format; and populating an Ethernet-layer OAM&P protocol message with the translated Layer 2 data link layer customer edge device configuration data.

15. The method of claim 11, further comprising authenticating and authorizing network presence of the customer edge device based upon data contained in the customer edge device configuration data request.

16. Logic encoded in one or more non-transitory tangible media for execution and when executed operable to:

receive a customer edge device configuration data request for Layer 2 data link layer customer edge device configuration data from a customer edge device via an Ethernet-layer OAM&P protocol;

transmit the customer edge device configuration data request via a configuration protocol;

receive the Layer 2 data link layer customer edge device configuration data via the configuration protocol in response to transmission of the customer edge device configuration data request via the configuration protocol; and transmit the Layer 2 data link layer customer edge device configuration data to the customer edge device via the Ethernet-layer OAM&P protocol.

17. The logic in one or more non-transitory tangible media of claim 16, when executed further operable to configure the customer edge device with the Layer 2 data link layer customer edge device configuration data.

18. The logic in one or more non-transitory tangible media of claim 16, when executed further operable to: transmit the customer edge device configuration data request via an Ethernet local management interface (E-LMI) protocol; and transmit the Layer 2 data link layer customer edge device configuration data via the E-LMI protocol.

19. The logic in one or more non-transitory tangible media of claim 16, when executed further operable to relay the customer edge device configuration data request from the Ethernet-layer OAM&P protocol to the configuration protocol.

20. The logic in one or more non-transitory tangible media of claim 19, when executed further operable to:

determine customer edge device parameters contained in the customer edge device configuration data request;

extract the customer edge device parameters from the customer edge device configuration data request via the Ethernet-layer OAM&P protocol; and insert the extracted customer edge device parameters into a customer edge device configuration data request formatted according to the configuration protocol.

21. The logic of claim 16 in one or more non-transitory tangible media, when executed further operable to relay the Layer 2 data link layer customer edge device configuration data from the configuration protocol to the Ethernet-layer OAM&P protocol.

22. The logic of claim 21, when executed further operable to:

validate a message according to the configuration protocol, the message containing the Layer 2 data link layer customer edge device configuration data;

extract the Layer 2 data link layer customer edge device configuration data from the message;

interpret the Layer 2 data link layer customer edge device configuration data;

translate the Layer 2 data link layer customer edge device configuration data into an Ethernet-layer OAM&P protocol format; and populate an Ethernet-layer OAM&P protocol message with the translated Layer 2 data link layer customer edge device configuration data.

23. The logic in one or more non-transitory tangible media of claim 16, when executed further operable to:

transmit the customer edge device configuration data request via an authentication, authorization, and accounting (AAA) protocol; and receive the Layer 2 data link layer customer edge device configuration data via the AAA protocol in response to transmission of the customer edge device configuration data request.

24. The logic in one or more non-transitory tangible media of claim 16, when executed further operable to: transmit the customer edge device configuration data request via customer premise equipment wide area network management protocol (CWMP); and receive the Layer 2 data link layer customer edge device configuration data via the CWMP based on the customer edge device configuration data request.

25. A system comprising:

means for transmitting a customer edge device configuration data request for Layer 2 data link layer customer edge device configuration data via an Ethernet-layer OAM&P protocol;

means for transmitting the Layer 2 data link layer customer edge device configuration data via a configuration protocol; and means for relaying the customer edge device configuration data request from the Ethernet-layer OAM&P protocol to the configuration protocol to receive the Layer 2 data link layer customer edge device configuration data in response to the customer edge device configuration data request transmitted via the Ethernet-layer OAM&P protocol, and for relaying the Layer 2 data link layer customer edge device configuration data from the configuration protocol to the Ethernet-layer OAM&P protocol.

\* \* \* \* \*